United States Patent [19]
Anderson et al.

[11] Patent Number: 5,708,206
[45] Date of Patent: Jan. 13, 1998

[54] CENTRIPETAL OPPOSED PENDULOUS ACCELEROMETER

[75] Inventors: Richard S. Anderson, Sandy, Utah; Roger Burlingame, Stevenson Ranch, Calif.; Jed C. Ludlow, Salt Lake City, Utah; Brian Norling, Santa Barbara, Calif.

[73] Assignee: Litton Systems, Inc., Woodland Hills, Calif.

[21] Appl. No.: 728,907

[22] Filed: Oct. 11, 1996

[51] Int. Cl.$^6$ ............................................. G01P 15/00
[52] U.S. Cl. ............................ 73/514.21; 73/514.36
[58] Field of Search ............................ 73/514.21, 514.36, 73/514.37

[56] References Cited

U.S. PATENT DOCUMENTS

| | | | |
|---|---|---|---|
| 4,082,005 | 4/1978 | Erdley | 73/504.03 |
| 4,126,046 | 11/1978 | Erdley | 73/504.03 |

*Primary Examiner*—Hezron E. Williams
*Assistant Examiner*—Helen C. Kwok
*Attorney, Agent, or Firm*—Robert E. Malm

[57] ABSTRACT

The invention utilizes a sensing body having a non-zero product of inertia to sense acceleration when spun about the y'-axis of an x'-y'-z' Cartesian coordinate system. The product of inertia is computed with respect to an x-y-z coordinate system fixed in the sensing body, the z-axis being in the x'-z' plane, they and y' axes being aligned in the absence of acceleration. The sensing body is pivotally attached to a platform and pivots about an axis parallel to the z-axis. A torquing device applies a torque about the z-axis to the sensing body sufficient to cause the angle between the y-axis and the y'-axis to be zero in the absence of acceleration when the sensing body is being spun at predetermined rate. The accelerometer also includes an orientation sensor which provides a measure of the angle between the y-axis and the y'-axis. A drive assembly rotates the platform about the y'-axis. A control circuit receives the output of the orientation sensor and causes the drive assembly to drive the platform at a rate which causes the orientation angle to be near zero. A rotation sensor provides a measure of either the angle of rotation of the platform or the angular velocity of the platform. The acceleration is determinable from the angular velocity of the platform and the velocity is determinable from the angle of rotation. The invention can also use an assembly of N individually-pivoting sensing bodies to sense acceleration.

25 Claims, 6 Drawing Sheets a centripetal opposed pendulous accelerometer.

CENTRIPETAL OPPOSED PENDULOUS ACCELEROMETER

BACKGROUND OF THE INVENTION

This invention relates generally to devices that measure acceleration and more specifically to precision accelerometers such as those used in inertial navigation systems.

The accelerometers used in inertial navigation systems are typically of the pendulous torque-to-balance variety. A typical unit uses a hinged pendulum as the acceleration sensing body. A position sensor produces an error signal when the pendulum begins to pivot away from its desired null position as a result of an acceleration, and this error signal is used by a control circuit to maintain the pendulum in its null position by means of an electrical control signal applied to a torquing device. The magnitude of the electrical control signal is proportional to the acceleration and thus is a measure of acceleration.

The accelerometer case may either be dry (i.e. filled with dry air or nitrogen) or fluid-filled. The fluid-filled variety results in a simplified pendulum design because of the natural damping of the pendulum resonances provided by the fluid, the ability of achieving a given pendulosity with a larger pendulum assembly as a result of the partial flotation provided by the fluid, and the ease of achieving good damping in the torque-to-balance loop. The disadvantage of using a fluid are the unique requirements that must be accommodated by the manufacturing process. The advantage of the dry units is the elimination of the problems associated with using a fluid. However, dry units require a more exacting pendulum design.

The invention described herein offers a new approach to the design of precision accelerometers in that it utilizes a spinning body as the acceleration sensing element. The sensing element spins in a dry environment, and there are consequently no fluid migration/stratification/compatibility issues which might argue against a long operating life. No electrical connections to the sensing element are required, and the device is radiation hard.

SUMMARY OF THE INVENTION

The centripetal opposed pendulous accelerometer utilizes a sensing body which senses acceleration when spun about the y'-axis of an x'-y'-z' Cartesian coordinate system, the product of inertia $I_{xy}$ of the sensing body being greater than zero. The product of inertia is computed with respect to an x-y-z coordinate system fixed in the sensing body, the z-axis being in the x'-z' plane, the y and y' axes being aligned in the absence of acceleration.

The sensing body is pivotally attached to a platform, the sensing body pivoting about an axis parallel to the z-axis. A torquing device applies a torque about the z-axis to the sensing body sufficient to cause the angle between the y-axis and the y'-axis to be zero in the absence of acceleration when the sensing body is being spun at a predetermined rate.

The accelerometer also includes an orientation sensor which provides a measure of the angle between the y'-axis and the y'-axis. A drive assembly rotates the platform about the y-axis. A rotation sensor provides a measure of either the angle of rotation of the platform or the angular velocity of the platform. The acceleration is determinable from the angular velocity of the platform and the velocity is determinable from the angle of rotation. A control circuit receives the output of the orientation sensor and causes the drive assembly to drive the platform at a rate which causes the orientation angle to be near zero.

The centripetal opposed pendulous accelerometer can also use an assembly of N sensing bodies which sense acceleration when spun about the y'-axis of an x'-y'-z' Cartesian coordinate system, the product of inertia $I_{xy}$ of each sensing body being greater than zero. The product of inertia of the n'th sensing body is computed with respect to an $x_n$-$y_n$-$z_n$ coordinate system fixed in the n'th sensing body, the $z_n$-axis being in the x'-z' plane, the $y_n$-axis and the y'-axis being aligned in the absence of acceleration, n taking on values from 1 to N.

DESCRIPTION OF THE PREFERRED EMBODIMENTS

Figure 1:
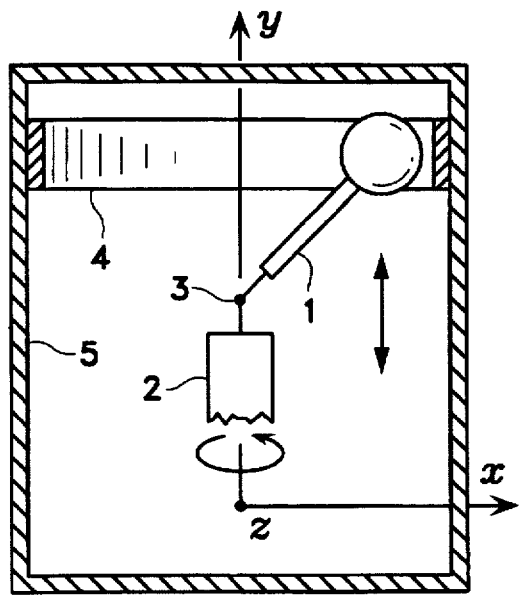
FIG. 1 illustrates the principle of operation of a centripetal opposed pendulous accelerometer utilizing a single sensing body.

The principle of operation of the centripetal opposed pendulous accelerometer (COPA) is illustrated in FIG. 1. The sensing body 1 is attached to the platform 2 by the flexure 3. The x-y-z Cartesian coordinate system shown in the figure (z axis out of the paper) is fixed with respect to the sensing body 1. The flexure 3 constrains the movement of the sensing body 1 to the x-y plane. In the absence of any acceleration, the platform 2 is spun at a rate $\Omega$ which causes the sensing body 1 to assume the position shown in the figure, the force applied by the flexure 3 just balancing the centrifugal force on the sensing unit as a result of the spinning about the y-axis. If there is now an acceleration in either of the directions indicated by the two-headed arrow, the sensing body 1 will attempt to rotate about the z-axis in the direction of the acceleration. A change in position of the sensing body 1 in the x-y-z coordinate system is detected by the change in capacitance between the sensing body 1 and a conducting ring 4 attached to the support structure (or case)

5 of the accelerometer. A control circuit, not shown, causes the spin rate to either increase or decrease to keep the capacitance the same and the position of the sensing body 1 unchanged. The change in spin rate is nearly proportional to the acceleration.

The equation of motion for the sensing body is $$I_{zz}\alpha + C\omega + [K+(I_{yy}-I_{xx})\Omega^2]\theta = -mr\alpha - I_{xy}\Omega^2 + T_B \quad (1)$$

The angle $\theta$ defines the orientation of the sensing body and the x-y-z coordinate system with respect to the x'-y'-z' coordinate system fixed with respect to the support structure 5. The y'-axis coincides with the y-axis when the sensing body 1 is in its null position as shown in the figure. The angle $\theta$ is the angle between the y-axis and the y-axis (when the sensing body is not in its null position). The time rate of change of $\theta$ is denoted by $\omega$ and the time rate of change of $\omega$ is denoted by $\alpha$. The damping coefficient is denoted by C, and the spring coefficient of the flexure is denoted by K. The moments and products of inertia of the sensing body 1 are denoted by I with appropriate subscripts. The spin rate of the sensing body 1 is denoted by $\Omega = \Omega_o + \Delta\Omega$. The symbol m stands for the mass of the sensing body 1, r is the distance of the center of mass of the sensing body 1 from the y-z plane, and $\alpha$ is the acceleration. The symbol $T_B$ represents any additional torque exerted on the sensing body 1.

Under steady-state conditions $\alpha$, $\omega$, and $\theta$ are all equal to zero, and $$\alpha = (I_{xy}/P)\Omega_o^2[2(\Delta\Omega/\Omega_o)+(\Delta\Omega/\Omega_o)^2] \quad (2)$$

where P, the pendulosity, is the product of m and r. Note first that $\alpha$ is very nearly a linear function of $\Delta\Omega$ since $\Delta\Omega$ is small compared to $\Omega_o$. Second, note that this technique for measuring acceleration requires that the sensing body have a non-zero $I_{xy}$.

Figure 2:
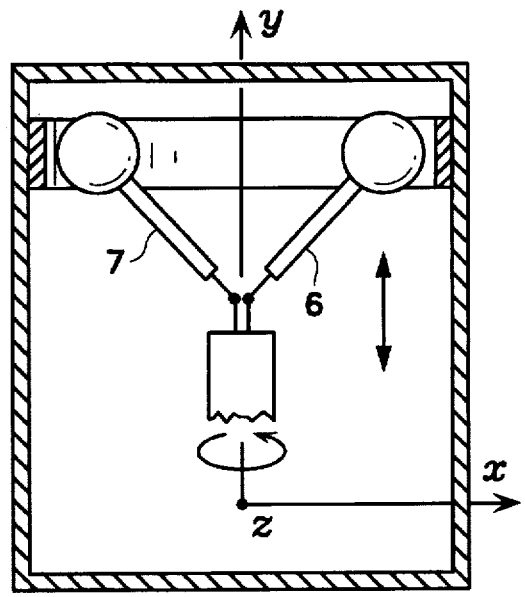
FIG. 2 illustrates the principle of operation of a centripetal opposed pendulous accelerometer utilizing two sensing bodies.

The configuration shown in FIG. 2 provides both a statically- and dynamically-balanced load for the drive assembly. Two sensing bodies 6 and 7 are used, each with its own flexure. The configuration of FIG. 2 can be expanded by adding more sensing bodies, each sensing body having its own flexure, until the sensing bodies form a cone.

Figure 3:
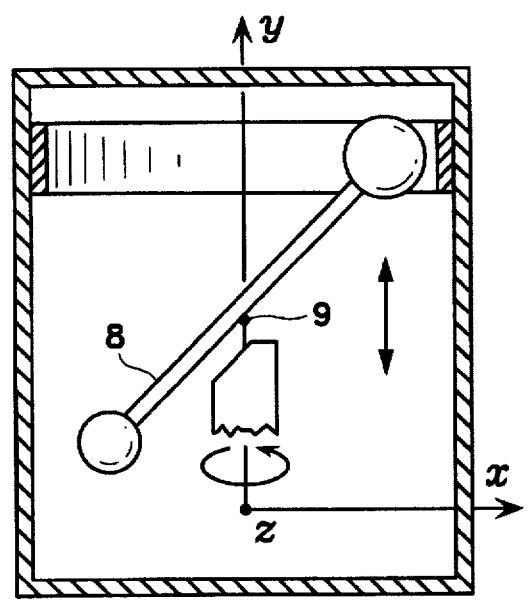
FIG. 3 illustrates a sensing body having mass distributed in both the first and second quadrants of a Cartesian coordinate system and a pivot point on the axis of rotation.

A somewhat different configuration is shown in FIG. 3. Here, the mass of the sensing body 8 is distributed on both sides of the flexure 9. All of the mass additively contributes to the magnitude of $I_{xy}$. However, the distribution of mass in the two x-y quadrants must be such as to give a center of mass offset in the x-direction from the flexure 9. This configuration has the same disadvantage as the configuration of FIG. 1 in that the sensing body is a statically unbalanced load as far as the driving assembly is concerned.

Figure 4:
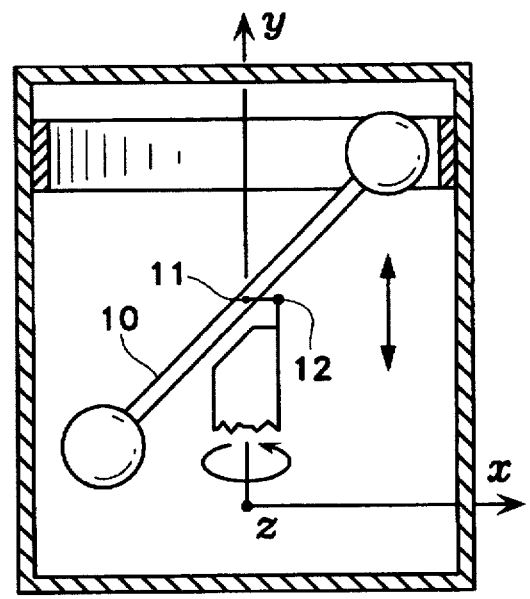
FIG. 4 shows a sensing body having mass distributed in both the first and second quadrants of a Cartesian coordinate system and a pivot point offset from the axis of rotation.

In the configuration of FIG. 4, the sensing body 10 is a statically balanced load as far as the driving assembly is concerned in that the center of mass 11 is on the axis of rotation. Even with the center of mass on the axis of rotation, the sensing body 10 is still able to sense acceleration because the pivot point of the flexure 12 is displaced from the axis of rotation.

Figure 5:
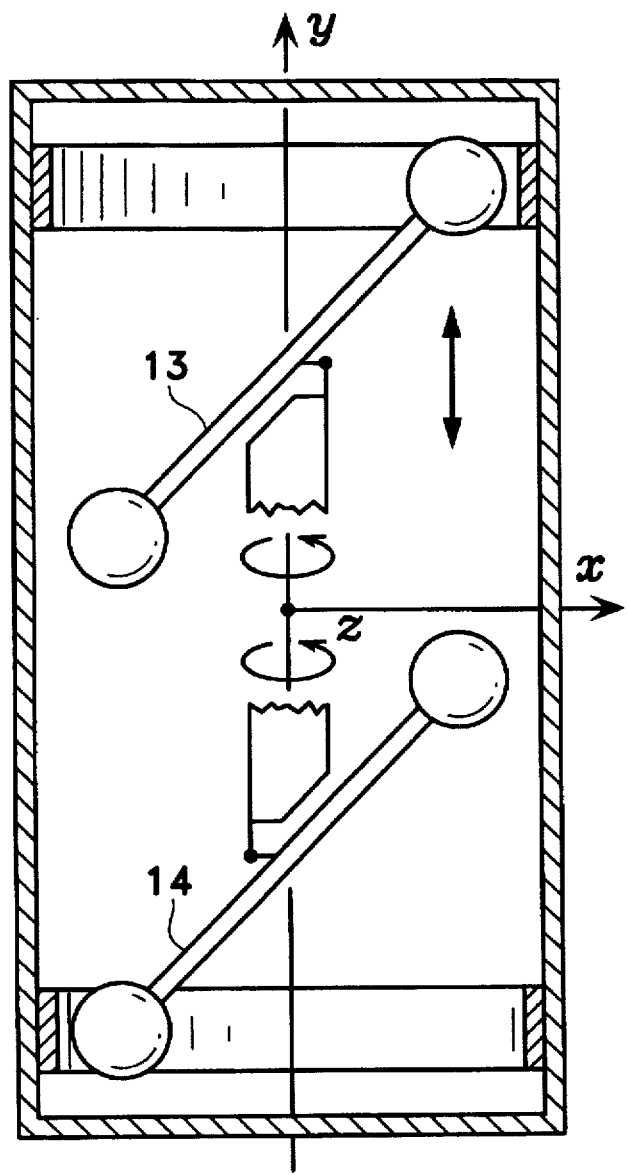
FIG. 5 shows two independently operating sensing bodies which pivot in opposite directions as a result of an acceleration.

In the configuration of FIG. 5, sensing bodies 13 and 14, which are like sensing body 10 in FIG. 4, are mounted such that they pivot in opposite directions as a result of an acceleration. Assuming a positive acceleration, sensing body 13 would have to be rotated at a rate of $\Omega_1=\Omega_o+\Delta\Omega_1$ and sensing body 14 at a rate of $\Omega_2=\Omega_o+\Delta\Omega_2$, where $\Delta\Omega_1$ is positive and $\Delta\Omega_2$ is negative if the orientations shown in FIG. 5 were to be maintained. The rate $\Omega_0$ is the rate required to maintain both sensing bodies 13 and 14 in the FIG. 5 orientations in the absence of an acceleration and assuming sensing bodies 13 and 14 have the same product of inertia $I_{xy}$.

The acceleration under these circumstances is given by $$a = \frac{2I_{xy}\Omega_o}{P_1+P_2}\left(1+\frac{\Delta\Omega_1+\Delta\Omega_2}{2\Omega_o}\right)(\Omega_1-\Omega_2) \quad (3)$$

where $P_1$ and $P_2$ are the pendulosities of sensing bodies 13 and 14 respectively. If the difference in magnitudes of $\Delta\Omega_1$ and $\Delta\Omega_2$ is small and $\Omega_o$ is large, the above equation approaches $$a = \frac{2I_{xy}\Omega_o}{P_1+P_2}(\Omega_1-\Omega_2) \quad (4)$$

which is a linear relationship. In reality, this relationship will never be reached, but the double-ended instrument of FIG. 5 will be more linear than the single-ended instrument of FIG. 4 as can be seen from a comparison of equations (2) and (3).

It should be noted that the embodiments shown in FIGS. 4 and 5 are statically balanced with respect to accelerations normal to the y-axis and are thus insensitive to such accelerations.

Figure 6:
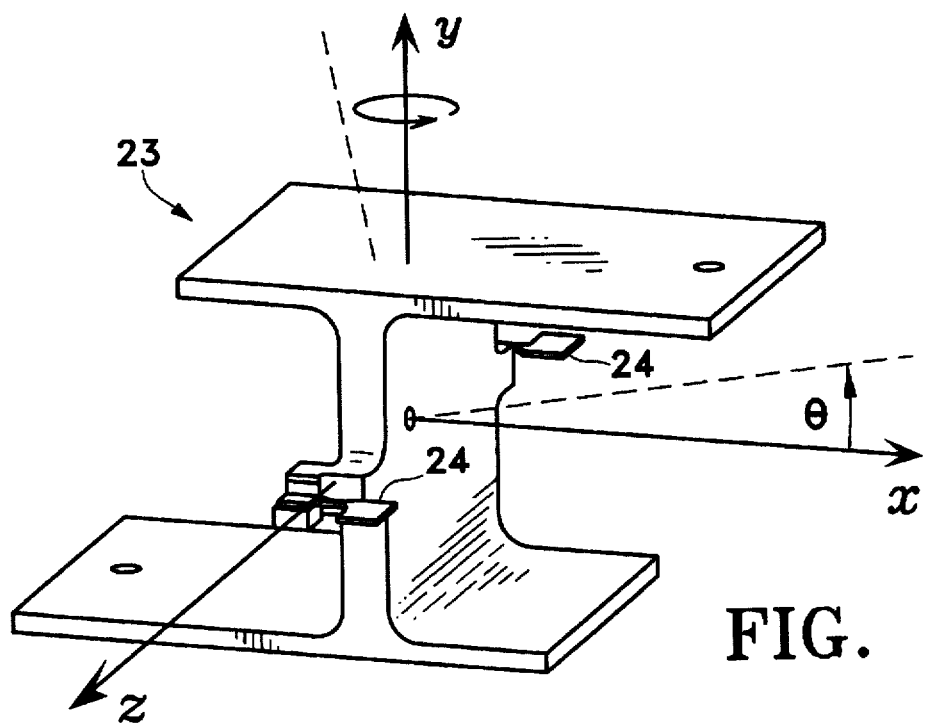
FIG. 6 shows the preferred embodiment of the sensing body for the centripetal opposed pendulous accelerometer.

The preferred embodiment of the sensing body 23 with attached flexures 24 is shown in FIG. 6.

The properties are as follows

| | | |
|---|---|---|
| $I_{xx}$ = 0.109 g·cm | m = 0.494 g | C = 30 μN·cm/(rad·s) |
| $I_{yy}$ = 0.109 g·cm | P = 0.013 g·cm | K = 1.15 mN·cm/rad |
| $I_{zz}$ = 0.143 g·cm | $\Delta\Omega$ = 2 rad/(s·gravity unit) | $T_B$ = 3.32 mN·cm |
| $I_{xy}$ = 0.032 g·cm | $\Omega_o$ = 100 rad/s | |

The center of mass of the sensing body 23 lies on the y-axis. The sensing body 23 is pivotally mounted on a platform by means of the flexures 24 so as to be free to rotate through small angles about an axis parallel to the z-axis. The sensing body -platform assembly is spun about a y'-axis fixed with respect to the platform, the y'-axis coinciding with the y-axis in the absence of acceleration. The sensing body 23 is machined from beryllium.

Figure 7:
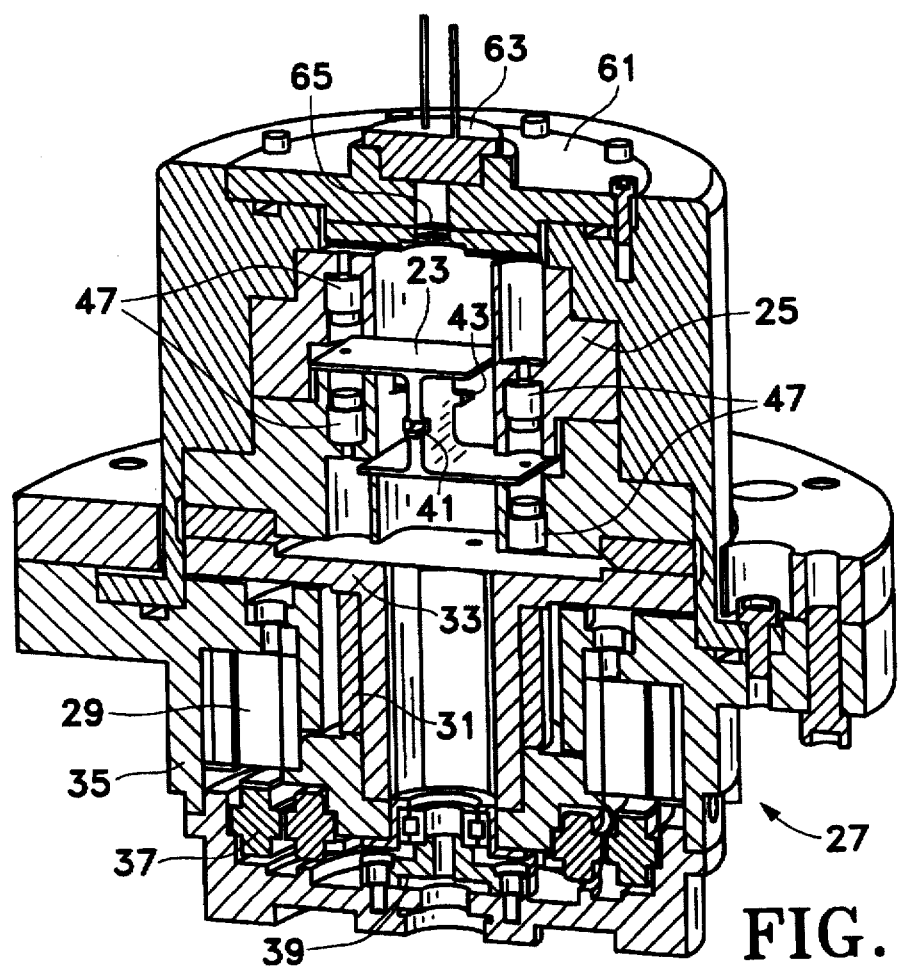
FIG. 7 shows a cut-away view of the preferred embodiment of a centripetal opposed pendulous accelerometer.

An embodiment of the COPA accelerometer is shown in FIG. 7. The sensing body 23 of FIG. 6 is shown attached to the platform 25. The platform 25 is mounted to the drive assembly 27 consisting of a brushless servomotor 29, precision ball bearings 31, and drive shaft 33. The drive assembly 27 is attached to the support structure 35. The rotation sensor 37 is a high-accuracy absolute angle resolver which provides servomotor commutation, demodulates the angular pickoff output, and provides a sine/cosine angle readout waveform. The rotary transformer 39 powers the resolver primary.

Figure 8:
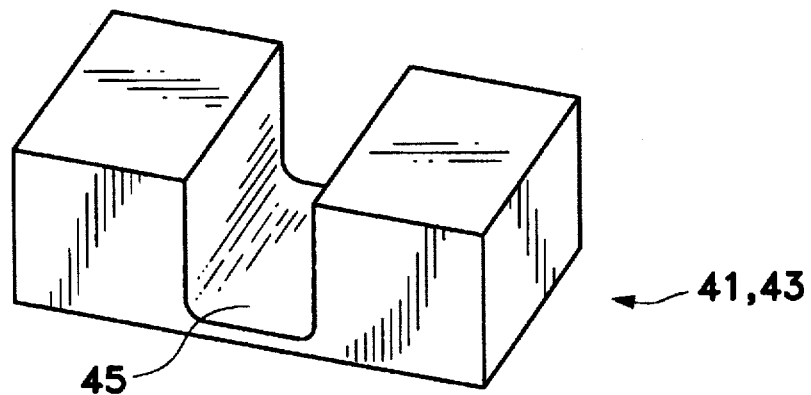
FIG. 8 shows the flexures which support the sensing body of FIG. 7 on the platform.

The sensing body 23 is attached to the platform 25 by two flexures 41 and 43. The flexure design is shown in FIG. 8. The flexures 41, 43 are 190 μm long by 150 μm wide by 127 μm thick and are made of ELIGILOY®. The hinge portion 45 is 64 μm long by 5 μm thick. The properties of the flexures are as follows:

| | |
|---|---|
| $K_{torsional}$ = 1.13 mN·cm/rad | $\sigma_{bending}$ = 8 MPa/mrad |
| $f_{n-torsional}$ = 5 Hz | $\sigma_{tensile}$ = 296 MPa/N |
| $K_{translational}$ = 13 μm/N | $P_{critical}$ (buckling) = 7.35 N |
| $f_{n-translational}$ = 1340 Hz | |

The angular freedom of a flexure is ±10 mrad.

Figure 9:
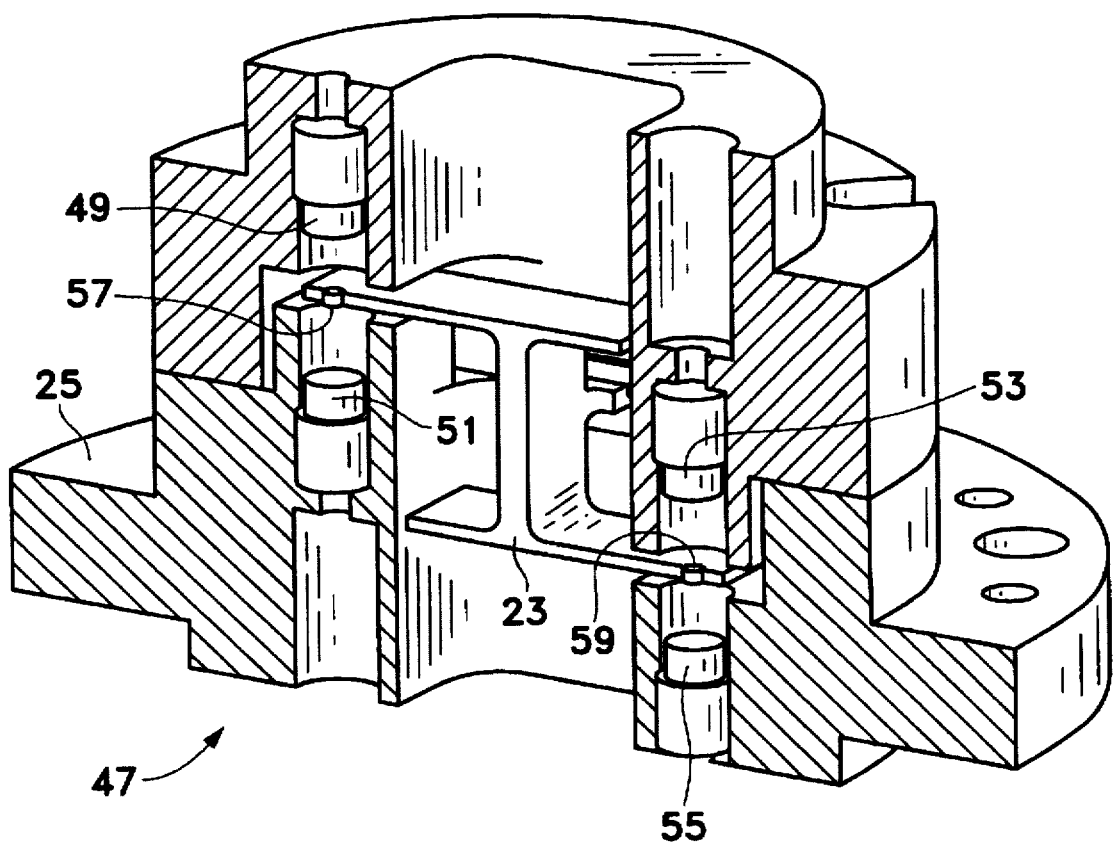
FIG. 9 shows a cut-away view of the sensing body/platform assembly which reveals the details of the torquing device.

The torquing device 47 provides the torque necessary to maintain the sensing body 23 in its null position while being spun at its zero-acceleration spin rate. The torquing device 47, shown in greater detail in FIG. 9 consists of four permanent magnets 49, 51, 53, and 55 installed on the platform 25 and two permanent magnets 57 and 59 installed in the sensing body 23. The south pole of magnet 57 is adjacent to the north pole of magnet 49, the north pole of magnet 57 is adjacent to the north pole of magnet 51, the north pole of magnet 59 is adjacent to the north pole of magnet 53, and the south pole of magnet 59 is adjacent to the north pole of magnet 55. This arrangement torques the sensing body 23 in a clockwise direction in opposition to the torque on the sensing body 23 that results from spinning the sensing body about the vertical axis. The magnets are made of samarium cobalt, are temperature compensated, and have an energy product of 72,000 T·A/m. The torque exerted by the torquing device 47 is very nearly constant at 33.2 µN·m for rotations of the sensing body 23 over a range of 20 mrad.

Figure 10:
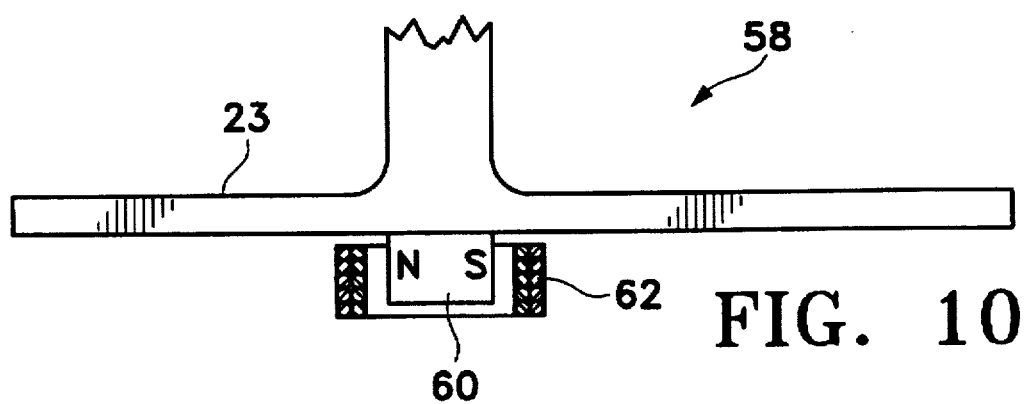
FIG. 10 shows an alternative torquing device.

An alterative torquing device 58 is shown in FIG. 10. A single permanent magnet 60 is mounted to the sensing element 23. A coil 62 attached to the platform 25 encircles the permanent magnet 60. Current in the coil creates a magnetic field normal to the north-south axis of the permanent magnet 60. The north-south axis attempts to align itself with the magnetic field thereby causing a torque normal to the drawing to be applied to the sensing body 23. The direction of the torque is controllable by the direction of the current in the coil, and the magnitude of the torque is controllable by the magnitude of the current.

Figure 11:
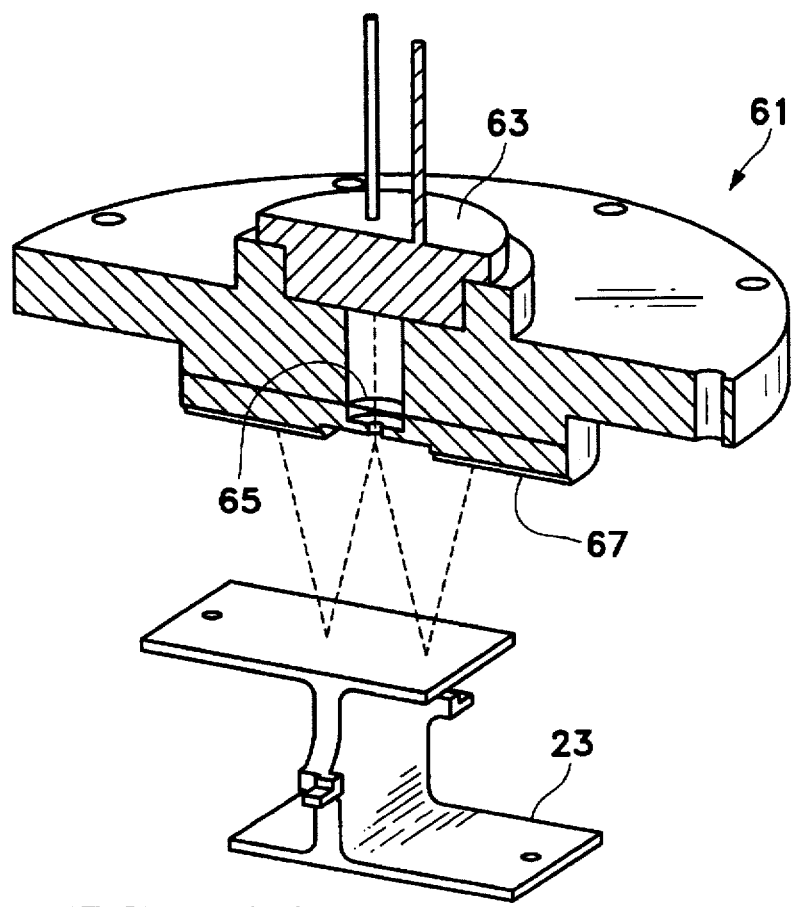
FIG. 11 shows the details of the orientation sensor.

The orientation of the sensing body relative to the platform is measured by the orientation sensor 61 (FIG. 7). The orientation sensor 61 is shown in more detail in FIG. 11. A super luminescent diode (SLD) 63 emits light rays which are collimated by the lens 65, reflected by the surface of the sensing body and detected by the PIN diode 67. When the sensing body 23 is in its null position, the light received in the four quadrants of the PIN diode 67 will be balanced. When the sensing body 23 departs from its null position, the light received in the four quadrants will be unbalanced. By appropriate processing of the electrical signals from the four quadrants, an error signal can be obtained which is a measure of the tilt angle of the sensing body 23.

The SLD produces light at a wavelength of 960 nm with a spectral bandwidth of 20 nm and a beam ellipticity of 1.7 to 1. The power output is 3 mW and the coherence length is 400 µm.

The position-sensing PIN photodiode is a standard 2.5-cm diameter quad cell customized with a center hole. The part is available from UDT Sensors Inc. The noise equivalent power of the part is 0.1 pW/√Hz, angle noise is 0.03 µrad/√Hz, and the scale factor is 2.7 mA/rad.

Figure 12:
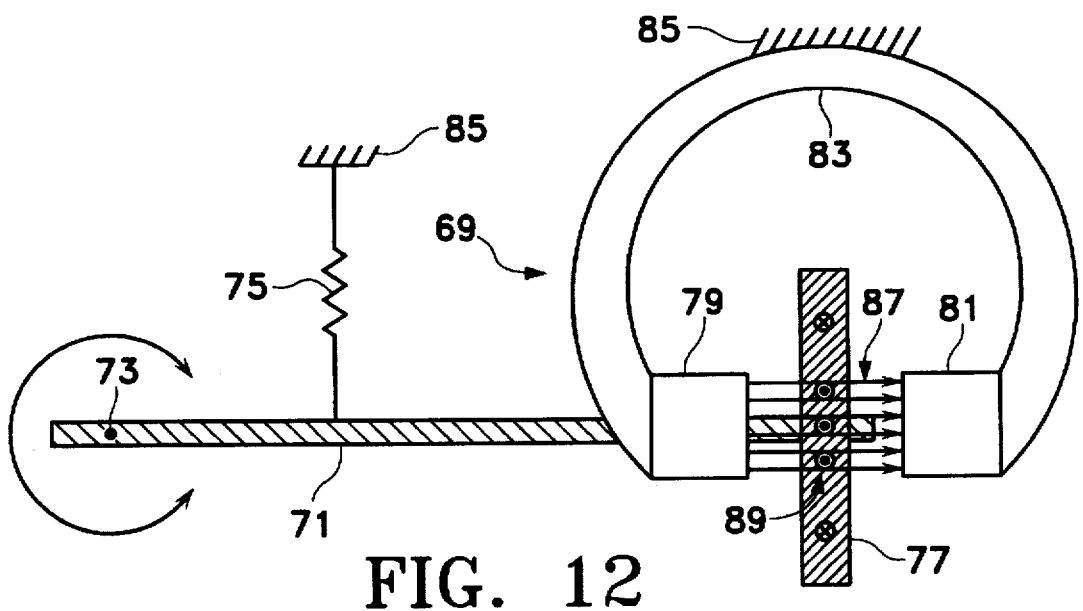
FIG. 12 illustrates the operation of the damping apparatus which damps oscillations of the sensing body.

In order to prevent the sensing body from hiring pivot-angle limit stops during vibration accelerations, the sensing body should be damped. The eddy current damper 69 shown in FIG. 12 is one approach to providing damping. The sensing body 23 is symbolically represented by the member 71 which pivots about axis 73. The flexures 41, 43 are symbolically represented by the spring 75. The platform 25 is symbolically represented by the diagonal lines 85.

Figure 13:
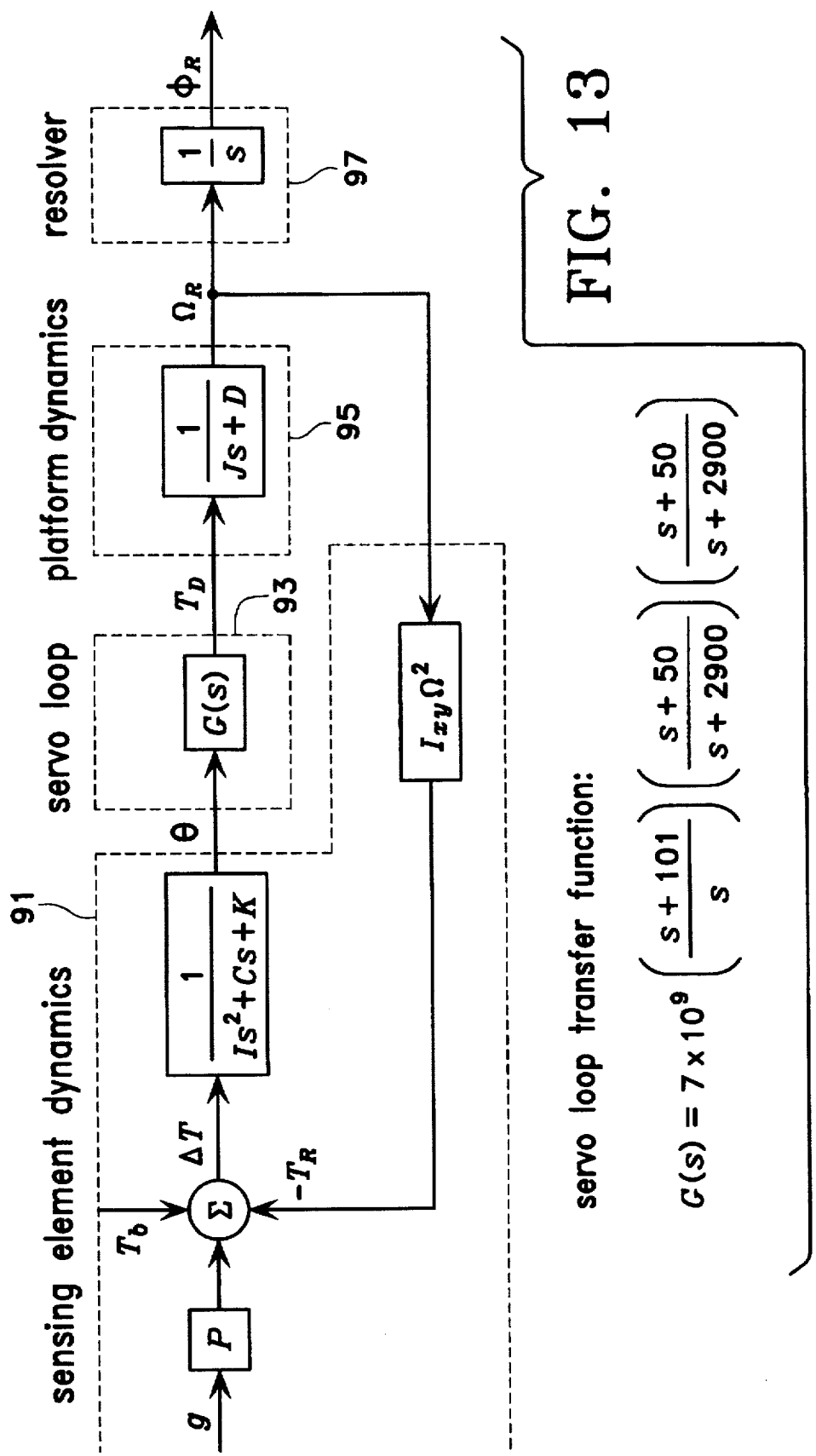
FIG. 13 shows a block diagram that mathematically defines the dynamics of the centripetal opposed pendulous accelerometer.

The eddy current damper consists of a copper sheet 77 approximately 0.4 cm square and 0.025 cm thick attached to the sensing body 23 and positioned between magnets 79 and 81 which are attached to the low-reluctance rerun path 83 which in mm is attached to the platform 25, symbolically represented by the diagonal lines 85. As the copper sheet 77 pivots with the sensing body 71 about the axis 73, the copper sheet moves through the magnetic field lines 87 resulting in the generation of eddy currents 89. Interaction of the eddy currents 89 with the magnetic field lines 87 results in a force on the copper sheet 77 proportional to the velocity of the sheet and in the opposite direction. The damping constant C is equal to the ratio of the eddy-current torque to the angular rate of the copper sheet and is given by the equation $$C = (B^2 R^2 At)/\rho \qquad (5)$$

where B is the magnetic flux density, R is the distance of the copper sheet 77 from the pivot axis 73, A is the pole area of the magnets 79, 81, t is the thickness of the copper sheet 77, and $\rho$ is the resistivity of copper. A value for C of $4.0 \times 10^{-7}$ N·m is obtained for the following parameter values:

$B=0.6733 T, R=0.762 cm, A=0.031 cm^2, t=0.025 cm,$ and $\rho=5.05 \times 10^{-8} \Omega \cdot m.$ The dynamics of COPA are mathematically defined by the block diagram shown in FIG. 13. The sensing body dynamics are defined in block 91. The symbol I denotes the same quantity as $I_{zz}$ did in FIG. 1. The servo loop transfer function indicated in block 93 is defined by the equation at the bottom of the J figure. The platform dynamics are defined in block 95. The symbol is the moment of inertia of the platform with respect to the spin axis. The symbol D is the damping coefficient for the platform. The values of J and D are 100 g·cm² and 4 mN·cm·s respectively. The resolver 97 provides a measure of the angle of rotation of the platform 25.

What is claimed is:

1. Apparatus for measuring acceleration comprising:

a sensing body which senses acceleration when spun about the y'-axis of an x'-y'-z' Cartesian coordinate system by pivoting about a pivot axis coinciding with or displaced from and parallel to the z-axis of an x-y-z Cartesian coordinate system fixed in the sensing body, the product of inertia $I_{xy}$ of the sensing body being greater than zero, the product of inertia being computed with respect to the x-y-z coordinate system, the z-axis being in the x'-z' plane, the y and y' axes being aligned in the absence of acceleration.

2. The apparatus of claim 1 further comprising:

a platform to which the sensing body is pivotally attached;

a drive assembly having a rotatable shaft to which the platform is rigidly attached, the x'-y'-z' coordinate system being fixed in the drive assembly, the shaft axis coinciding with the y'-axis.

3. The apparatus of claim 2 wherein the sensing body is pivotally attached to the platform with one or more flexures, the flexures bending when the sensing body pivots, the flexures applying a torque to the sensing body when the flexures bend which balances in whole or in part the torque resulting from the centrifugal force exerted on the sensing body as it spins about the y'-axis.

4. The apparatus of claim 2 further comprising:

a torquing device which applies a torque to the sensing body about the z-axis sufficient to cause the angle between the y-axis and the y'-axis to be zero in the absence of acceleration when the sensing body is being spun at a predetermined rate, the torque applied by the torquing device balancing in whole or in part the torque resulting from the centrifugal force exerted on the sensing body as it spins about the y'-axis.

5. The apparatus of claim 2 further comprising:

an orientation sensor which provides a measure of the orientation angle, the orientation angle being the angle between the x-axis and the x'-z' plane.

6. The apparatus of claim 2 wherein the sensing body tilts in response to an acceleration of the drive assembly along the y'-axis, a measure of the tilt being the angle between the x-axis and the x'-z' plane.

7. The apparatus of claim 2 wherein the sensing body tilts in response to a change in the spin rate of the sensing body, a measure of the tilt being the angle between the x-axis and the x'-z' plane.

8. The apparatus of claim 5 further comprising:
a control circuit for controlling the drive assembly, the control circuit receiving as input the output of the orientation sensor, the control circuit causing the drive assembly to spin the platform at a rate which causes the orientation angle to be near zero.

9. The apparatus of claim 2 further comprising:
a damping apparatus for damping oscillations of the sensing body about the pivot axis.

10. The apparatus of claim 2 wherein the sensing body is insensitive to accelerations normal to the y'-axis.

11. The apparatus of claim 2 wherein the center of mass of the sensing body is on the y-axis and the pivot axis is displaced from the y'-axis.

12. Apparatus for measuring acceleration comprising:
one or more assemblies of N sensing bodies which sense acceleration when spun about the y'-axis of an x'-y'-z' Cartesian coordinate system by the n'th sensing body pivoting about a pivot axis coinciding with or displaced from and parallel to the $z_n$-axis of an $x_n$-$y_n$-$z_n$ Cartesian coordinate system fixed in the n'th sensing body, the sensing bodies being denoted by integers from 1 to N, N being an integer greater than 1, the product of inertia $I_{xy}$ of each sensing body being greater than zero, the product of inertia of the n'th sensing body being computed with respect to the $x_n$-$y_n$-$z_n$ coordinate system, the $z_n$-axis being in the x'-z' plane, the $y_n$-axis and the y'-axis being aligned in the absence of acceleration.

13. The apparatus of claim 12 further comprising:
one or more platforms to which the sensing bodies are pivotally attached, each assembly of sensing bodies being pivotally attached to a different platform,
one or more drive assemblies fixed with respect to the x'-y'-z' coordinate system, each drive assembly having a rotatable shaft to which a platform is rigidly attached, the shaft axis of each drive assembly coinciding with the y'-axis, a drive assembly causing an attached platform to spin about the y'-axis.

14. The apparatus of claim 13 wherein each of the N sensing bodies is pivotally attached to a platform with one or more flexures, the flexures bending when the sensing body pivots, the flexures applying a torque to the sensing body when the flexures bend which balances in whole or in part the torque resulting from the centrifugal force exerted on the sensing body as it spins about the y'-axis.

15. The apparatus of claim 13 further comprising:
a torquing apparatus which applies a torque to each of the N sensing bodies in an assembly directed along the pivot axis sufficient to cause the typical orientation angle to be zero in the absence of acceleration when the sensing bodies in an assembly are being spun at a predetermined rate, the orientation angle n being the angle between the $x_n$-axis and the x'-z' plane, the typical orientation angle being less than the largest of the orientation angles n and greater than the smallest of the orientation angles n.

16. The apparatus of claim 13 further comprising:
an orientation sensing apparatus which provides a measure of the typical orientation angle for each of the assemblies of sensing bodies, the orientation angle n being the angle between the $x_n$-axis and the x'-z' plane, the typical orientation angle for each of the assemblies being less than the largest of the orientation angles n and greater than the smallest of the orientation angles n.

17. The apparatus of claim 16 wherein the typical orientation angle for one assembly and the typical orientation angle for another assembly are opposite in sign.

18. The apparatus of claim 13 wherein each of the one or more drive assemblies is rotatably attached to a different platform and the n'th sensing body tilts in response to an acceleration of the drive assemblies along the y'-axis, measures of the tilt being the angle between the $x_n$-axes and the x'-z' plane.

19. The apparatus of claim 13 wherein the n'th sensing body tilts in response to a change in the spin rate of the n'th sensing body, a measure of the tilt being the angle between the $x_n$-axis and the x'-z' plane.

20. The apparatus of claim 16 further comprising:
a control circuit for controlling the spin rates of the one or more drive assemblies, the control circuit receiving as inputs the outputs of the orientation sensing apparatus, the control circuit causing the one or more drive assemblies to drive the one or more platforms at rates which cause the typical orientation angles to be near zero.

21. The apparatus of claim 13 comprising:
a damping apparatus for damping the oscillations of the sensing bodies about the pivot axes.

22. The apparatus of claim 13 wherein each of the N sensing bodies is insensitive to accelerations normal to the y'-axis.

23. The apparatus of claim 13 wherein the center of mass of the n'th sensing body is on the $y_n$-axis and the pivot axis of the n'th sensing body is displaced from the y'-axis.

24. A method for using the apparatus of claim 1 comprising the steps:
spinning the sensing body at a predetermined rate;
applying a torque to the sensing body, in the absence of any acceleration, to restore the angle between the y-axis and the y'-axis to zero;
subjecting the x'-y'-z' coordinate system to an acceleration;
adjusting the spin rate to restore the angle between the y-axis and the y'-axis to zero;
determining the acceleration from the change in spin rate.

25. A method for using the apparatus of claim 12 comprising the steps:
spinning the one or more assemblies of sensing bodies at predetermined rates;
applying torques to the sensing bodies, in the absence of any acceleration, to restore the typical orientation angle for each of the assemblies of sensing bodies to zero, the orientation angle n being the angle between the $x_n$-axis and the x'-z' plane, the typical orientation angle for each of the assemblies being less than the largest of the orientation angles n and greater than the smallest of the orientation angles n;
subjecting the x'-y'-z' coordinate system to an acceleration;
adjusting the spin rate of each assembly to restore the typical orientation angle to zero;
determining the acceleration from the change in spin rates of the one or more assemblies of sensing bodies.

* * * * *

UNITED STATES PATENT AND TRADEMARK OFFICE
CERTIFICATE OF CORRECTION

PATENT NO : 5,708,206
DATED : January 13, 1998
INVENTOR(S) : Anderson, Burlingame, Ludlow, and Norling It is certified that error appears in the above-identified patent and that said Letters Patent are hereby corrected as shown below:

```
Col. 1, line 3, insert
```
STATEMENT REGARDING FEDERALLY-SPONSORED
RESEARCH OR DEVELOPMENT This invention was made with Government support under Contract No. N00030-95-C-0012 awarded by the Department of the Navy. The Government has certain rights in this invention.

Signed and Sealed this

Nineteenth Day of May, 1998

*Attest:*

BRUCE LEHMAN

*Attesting Officer*   Commissioner of Patents and Trademarks